(12) United States Patent
Silvestri et al.

(10) Patent No.: US 11,378,448 B2
(45) Date of Patent: Jul. 5, 2022

(54) OPTICAL DEVICE AND SPECTROMETER COMPRISING SUCH A DEVICE

(71) Applicant: NEDERLANDSE ORGANISATIE VOOR TOEGEPAST— NATUURWETENSCHAPPELIJK ONDERZOEK TNO, s-Gravenhage (NL)

(72) Inventors: Fabrizio Silvestri, Delft (NL); Jonas Berzins, Jena (DE); Zuzanna Deutschmann, Wroclaw (PL); Gerini Giampiero, 's-Gravenhage (NL); Stefan Michael Bruno Bäumer, Eindhoven (NL)

(73) Assignee: NEDERLANDSE ORGANISATIE VOOR TOEGEPAST— NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 0 days.

(21) Appl. No.: 16/981,527

(22) PCT Filed: Mar. 21, 2019

(86) PCT No.: PCT/NL2019/050173
§ 371 (c)(1),
(2) Date: Sep. 16, 2020

(87) PCT Pub. No.: WO2019/182444
PCT Pub. Date: Sep. 26, 2019

(65) Prior Publication Data
US 2021/0302230 A1   Sep. 30, 2021

(30) Foreign Application Priority Data
Mar. 21, 2018 (EP) .................................... 18163133

(51) Int. Cl.
*G01J 3/02* (2006.01)
*G01J 3/26* (2006.01)
(Continued)

(52) U.S. Cl.
CPC ........... *G01J 3/0224* (2013.01); *G01J 3/0256* (2013.01); *G01J 3/26* (2013.01); *G01J 3/2823* (2013.01);
(Continued)

(58) Field of Classification Search
CPC ...................................................... G01J 3/0224
(Continued)

(56) References Cited

U.S. PATENT DOCUMENTS 4,770,500 A      9/1988   Kalmanash et al.
6,483,640 B1 *  11/2002   Tonucci ................. B82Y 20/00
                                                                    359/361
(Continued)

FOREIGN PATENT DOCUMENTS

CN     106099381 A  *  11/2016  ............. G01Q 70/12

OTHER PUBLICATIONS

Arbabi et al., "Complete Control of Polarization and Phase of Light with High Efficiency and Sub-wavelength Spatial Resolution", *Physics Optics*, (Nov. 6, 2014).
(Continued)

*Primary Examiner* — Tarifur R Chowdhury
*Assistant Examiner* — Omar H Nixon
(74) *Attorney, Agent, or Firm* — Leydig, Voit & Mayer, Ltd.

(57) ABSTRACT

The optical device comprises a group of Fabry-Perot resonators, formed by a stack of a first and second partial reflection layer and an intermediate layer between the first and second partial reflection layer. The intermediate layer comprises a dielectric material and a group of arrays of posts
(Continued)

embedded in the dielectric material at different positions along the intermediate layer. Each array in the group contains posts of a different non-circular shape and/or orientation in cross-section with a plane parallel to the reflection layers. As a result, Fabry-Perot resonators are formed in areas that contain different arrays, each having first and second resonance peaks at mutually different resonance frequencies for different polarization components. Light intensity sensors may be provided located below the different areas. From the intensities measured by the sensors, the intensities of different polarization components of the light can be computed over a range of wavelengths.

10 Claims, 4 Drawing Sheets

(51) Int. Cl.
    *G01J 3/28*     (2006.01)
    *G01J 4/00*     (2006.01)
    *G02B 5/28*     (2006.01)

(52) U.S. Cl.
    CPC ............... *G01J 4/00* (2013.01); *G02B 5/288* (2013.01); *G01J 2003/2826* (2013.01)

(58) Field of Classification Search
    USPC ........................................................ 356/319
    See application file for complete search history.

(56) References Cited

U.S. PATENT DOCUMENTS

| | | | |
|---|---|---|---|
| 6,730,446 | B2 | 5/2004 | Sahouani et al. |
| 9,255,791 | B2 | 2/2016 | Popescu et al. |
| 9,261,753 | B2 | 2/2016 | Guo et al. |
| 9,453,947 | B2 | 9/2016 | Arbabi et al. |
| 9,482,887 | B2 | 11/2016 | Horie et al. |
| 2009/0310133 | A1 | 12/2009 | Ogino et al. |
| 2015/0219806 | A1 | 8/2015 | Arbabi et al. |
| 2016/0033755 | A1 | 2/2016 | Horie et al. |
| 2016/0077261 | A1 | 3/2016 | Arbabi et al. |
| 2016/0258069 | A1* | 9/2016 | Nesbitt ............... H01L 31/0352 |
| 2016/0299337 | A1 | 10/2016 | Arbabi et al. |
| 2016/0306079 | A1 | 10/2016 | Arbabi et al. |
| 2016/0316180 | A1 | 10/2016 | Han et al. |
| 2017/0030773 | A1 | 2/2017 | Han et al. |
| 2017/0034500 | A1 | 2/2017 | Arbabi et al. |
| 2017/0059777 | A1 | 3/2017 | Han et al. |
| 2017/0160473 | A1 | 6/2017 | Mazur et al. |
| 2017/0188901 | A1 | 7/2017 | Faraon et al. |
| 2017/0212285 | A1 | 7/2017 | Arbabi et al. |
| 2018/0284509 | A1* | 10/2018 | Chanda .................. G02B 5/008 |
| 2018/0374981 | A1* | 12/2018 | Carr ....................... H05B 3/009 |

OTHER PUBLICATIONS

Arbabi et al., "Dielectric metasurfaces for complete control of phase and polarization with subwavelength spatial resolution and high transmission", *Nature Nanotechnology*, 10: 937-943 (2015).
Arbabi et al., "Subwavelength-thick lenses with high numerical apertures and large efficiency based on high-contrast transmitarrays", *Nature Communications*, 6:7069 (2015).
Geelen et al., "A snapshot multispectral imager with integrated tiled filters and optical duplication", *Adv. Fab. Tech. for Micro/Nano Optics and Photonics VI* (Mar. 5, 2013).
Jahani et al., "All-dielectric metamaterials", *Nature Nanotechnology*, vol. 11 (2016).
Silvestri et al., "Robust design procedure for dielectric resonator metasurface lens array", *Optics Express*, 24(25):29153-29169 (2016).
The International Bureau of WIPO, International Preliminary Report on Patentability No. PCT/NL2019/050173 (dated Oct. 1, 2020).
Patent Cooperation Treaty, International Search Report in International Application No. PCT/NL2019/050173 (dated Jul. 30, 2019).
Patent Cooperation Treaty, Written Opinion in International Application No. PCT/NL2019/050173 (dated Jul. 30, 2019).
Horie et al, "Wide bandwidth and high resolution planar filter array based on DBR-metasurface-DBR structures", arxiv.org, *Cornell University Library Ithaca, NY* 14853, pp. 1-6 (2016).

\* cited by examiner

OPTICAL DEVICE AND SPECTROMETER COMPRISING SUCH A DEVICE

CROSS-REFERENCE TO RELATED APPLICATIONS

This patent application is the U.S. national phase of International Application No. PCT/NL2019/050173, filed on Mar. 21, 2019, which claims the benefit of European Patent Application No. 18163133.4, filed Mar. 21, 2018, the disclosures of which are incorporated herein by reference in their entireties for all purposes.

The invention relates to an optical device, an optical filter and a spectrometer comprising such a filter.

BACKGROUND

Yu Horie et al. describe a planar array of optical bandpass filters in an article by titled "Wide bandwidth and high resolution planar filter array based on DBR-metasurface-DBR structures", published in Optics Express 24, 11 (2016). The optical bandpass filters are composed of dielectric metasurface layers sandwiched between two distributed Bragg reflectors (DBRs). The metasurface layer functions as a phase shifting element that affects the transmission spectrum of light. For example, the two DBRs may be used to form a Fabry-Perot resonator whose resonance wavelength is controlled by the design of the metasurface layer, so that substantially only the spectral components of the light at and near the resonance wavelength are transmitted. In an on-chip optical system, such a filter array can be directly integrated on top of a photodetector array. In such a system the filter array may be used to provide for different resonance wavelengths on top of different photodetector of the photodetector array, so to realize a high-resolution spectrometer.

It is known to measure spectra of selected polarization components of incoming light by placing a polarization filter in front of a spectrometer. Measurement of spectra of two polarization components can be obtained by rotating or exchanging the polarization filter or by using a polarization splitter with different polarization filters at its outputs.

Arbabi et al. describe the construction of polarization filter for monochromatic light in an article titled "Dielectric metasurfaces for complete control of phase and polarization with subwavelength spatial resolution and high transmission", published in Nature Nanotechnology 10, (2015). Arbabi's polarization filter comprises a metasurface comprising an array of subwavelength posts of elliptical cross-section. Arbabi et al. describe use of such a metasurface for generating two different wavefronts for two orthogonal input polarizations and the generation of light with an arbitrarily selectable phase and polarization distribution from an incident light with a given polarization.

US2009310133 describes a light transmission device with an rectangular aperture in a metal thin film. The length of the long side determines the peak wavelength of transmitted light. The length of the short side of the aperture is smaller than the wavelength of incident light. US2009310133 describes that as a result one polarization component is substantially blocked from light that is transmitted through the aperture.

SUMMARY

Among others, it is an object to provide for a compact optical device that is capable of measuring spectral intensities of different polarization components of incoming light. Moreover it is an object to provide for a spectrometer system to measure spectra of different polarization components of incoming light, and for a filter device suitable for use in such a spectrometer.

A device is provided. Herein the combination of the first and second reflector layers form resonators, each resonator comprising a respective arrays of posts of non-circular cross-section between the reflectors of the resonators are used to differentiate the resonance wavelengths of different polarization components. Each resonator makes it possible to obtain measurements of a sum of intensities of two different polarization components at two different frequencies, corresponding to different free space wavelengths.

A group of such measurements obtained using a plurality of resonators that transmit sums of different combinations of components makes it possible to compute the intensities of the different polarization components when the shape and/or length of the posts is selected to limit the number of different resonance frequencies in the group. No further polarization filter other than the group of arrays of posts is needed for this. When the number N of different resonance frequencies of a group of M resonators is limited to M/2 or less, the intensities of two polarization components can in principle be computed for each frequency, by inverting the expressions for the measured intensities in terms of the intensities of the different polarization components.

It should be noted that it is not necessary that $M=2*N$. If $M>2*N$ there will be some redundancy, which may be used to improve the accuracy of the measurement, e.g. by fitting the intensities of the polarization components to the measurements according to a least square criterion. M may be less that $2*N$ ($M<2*N$) if it suffices to measure ratios of intensities.

As example of the inversion, the inversion is a matter of inverting a cyclic set of expressions if the group of resonators corresponds to a cyclically ordered set of resonators (i.e. in a set wherein the resonators $R(i)$ are labeled by an index i and $R(i)=R(i+M)$; the index being independent of the physical location of the resonator), wherein one resonance peak of each resonator ($R(i)$) coincides with the resonance peak for the same polarization component of the next resonator ($R(i+1)$) in the cyclically ordered set. As a consequence, the other resonance peak of the resonator $R(i)$ coincides with the resonance peak for the same polarization component of the previous resonator ($R(i-1)$) in the cyclically ordered set.

Although a cyclic set of expressions applies exactly when the peaks for the same polarity of resonators $R(i)$ and $R(i+1)$ coincide, in practice the cyclic set of expressions also provides useful results if the correspond with each other in the sense that they coincide or at least if they can be used as if they coincide. This is so for example if two peaks lie within a distance from each other over which the spectral intensity of the incoming light does not significantly change. When the optical device is designed for use in an optical spectrometer system, the device may include resonators that are resonant at a first series of successively higher frequencies for a first polarization component and a second series of successively higher frequencies for a second polarization component. In such a device, each resonant peak of the first series is said to correspond with a resonant peak of the second series if these peaks coincide or at least if are used as if they coincide, for example when they lie closer to each other than to other peaks in the series.

Preferably, the sets of resonance frequencies for the different polarization components of the resonators in the cyclically ordered set of resonators are the same (although this is not necessary). This can easily be realized by using pairs of resonators in the cyclically ordered set that differ only by a ninety degree rotation of the arrays of posts of the resonators in the pair.

In an embodiment a group of resonators is used that corresponds to a cyclically ordered set of six resonators, with resonance peaks at three frequencies, each frequency corresponding to two resonance peaks of different polarization states.

However a group of more than six or less than six resonators may be used. For example only two different resonance frequencies suffice if a group of four different arrays is used wherein the shape and/or length of the posts is selected so that all have the same pair of resonance frequencies and produce sums of intensities of four frequency-polarization combinations in independent ways, the intensity of the four frequency-polarization combinations can be computed as a solution of expressions for the measured intensities in terms of the four frequency-polarization combinations.

In an embodiment the group of arrays comprises at least one pair of arrays with posts having cross-sections that differ only by a ninety degree rotation. Preferably the group of arrays consists of a plurality of pairs of arrays, the cross-sections of the posts of the arrays within each pair differ only by a ninety degree rotation. Use of one or more pairs with ninety degree rotation reduces the number of different shapes of cross-sections that needs to be used.

In an embodiment the optical device comprises one or more further groups of arrays of posts embedded in the dielectric material of the intermediate layer, the posts in the arrays of the group having a first height, the posts in the arrays of a further group having a second height, different from the first height. This makes it possible to realize groups for different sets of frequencies, thereby extending the frequency range using a limited number of cross-section shapes.

In an embodiment the optical device comprises a one or two dimensional array of identical groups of arrays of posts embedded in the dielectric material of the intermediate layer. The groups may form pixels of an image sensor. This makes it possible to provide an image sensor that can form images of intensities of different polarization components.

In an embodiment the device comprises a group of photodetectors, each located to receive light transmitted through a respective one of the parts of the stacks. Preferably the photodetectors and the stack are integrated in a single device, e.g. with the layers of the stack deposited on top of a layer that contains the photodetectors.

In an embodiment an optical spectrometer system is provided, comprising the optical device with the photodetectors coupled to a data processing system configured to compute intensities of different polarization components at the resonance frequencies. The data processing system may be integrated in the device, or comprise an external computer.

A method of determining wavelength and polarization dependent intensities of components of incoming light is also provided.

BRIEF DESCRIPTION OF THE DRAWING

These and other objects and advantage will become apparent for a description of exemplary embodiments with reference to the following figures.

DETAILED DESCRIPTION OF EXEMPLARY EMBODIMENTS

Figure 1:
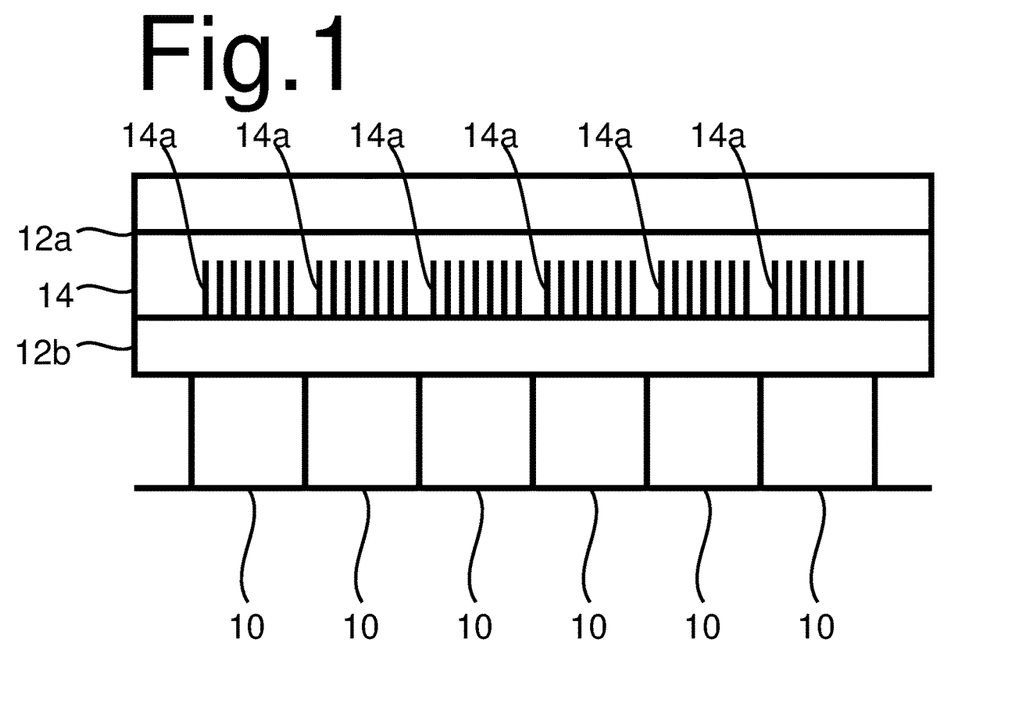
FIG. 1 shows a cross section of a spectrometer device
Figure 2A:
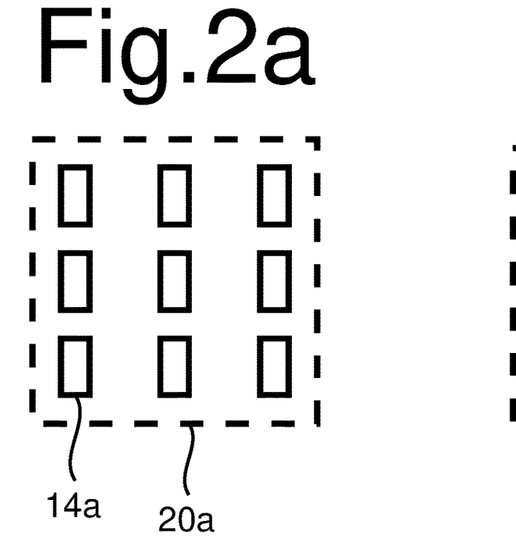
FIGS. 2a-f show a cross-sections of arrays of posts
Figure 2B:
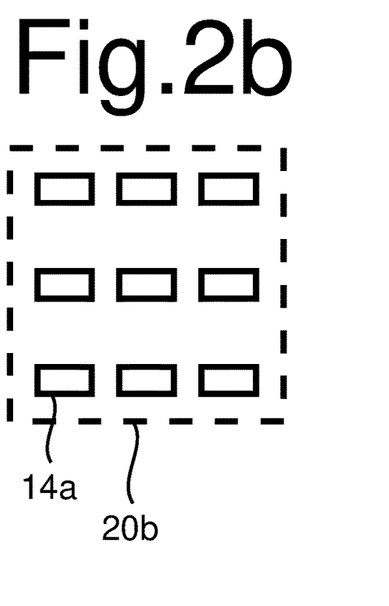
Figure 2C:
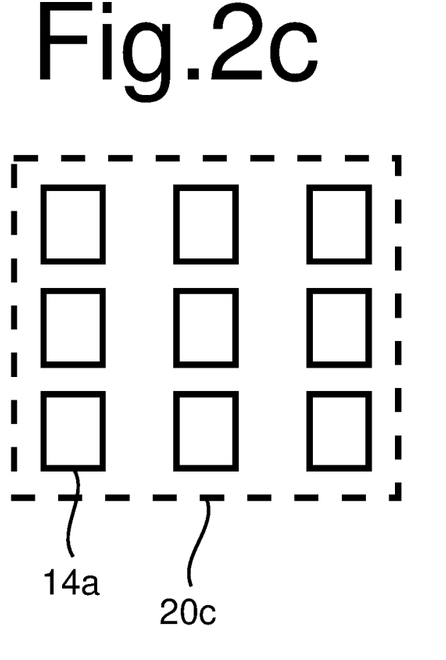
Figure 2D:
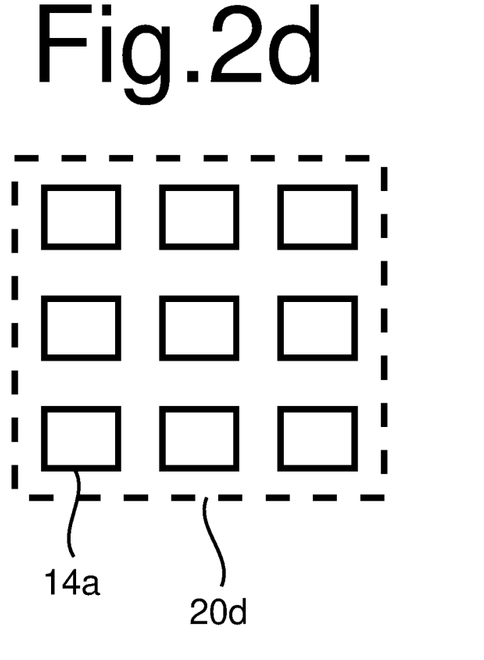
Figure 2E:
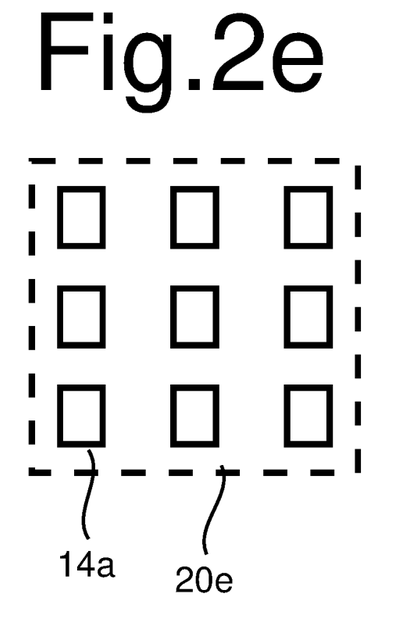
Figure 2F:
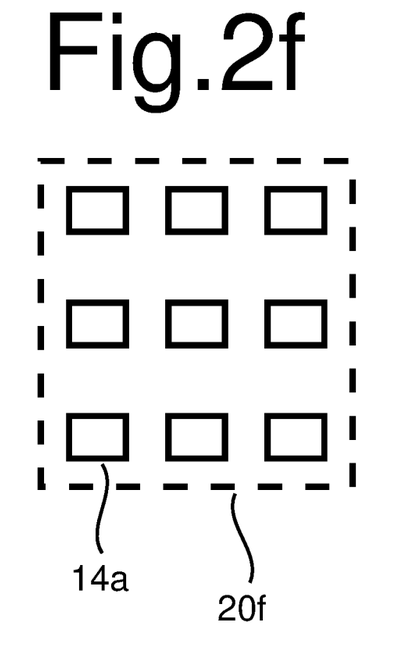

FIG. 1 shows a cross section of a spectrometer device, comprising an array of photodetectors 10, and a stack of layers comprising reflector layers 12a,b and an intermediate layer 14. Intermediate layer 14 is located between reflector layers 12a,b and the stack of reflector layers 12a,b and intermediate layer 14 is located on top of the array of photodetectors 10. The direction perpendicular to the layers is indicated as the z-direction and a direction along the layers is indicated as the x direction. The reflector layers 12a,b are partially reflecting layers, so that an optical cavity is formed between the layers (e.g. as in a Laser) to and from which light is passed through reflector layers 12a,b. In the illustrated embodiment, each reflector layer 12a,b comprises a plurality of sub layers 120, 122 of optically transparent materials having different indexes of refraction, forming a distributed Bragg reflector. Instead a layer of a single partially reflecting material may be used, e.g. a metal layer. Use of a distributed Bragg reflector makes it possible to optimize reflectivity for the resonance frequencies of the Fabry-Perot resonators, so that a high quality factor can be achieved. Furthermore, the distributed Bragg reflector makes it possible to select one resonance mode of the Fabry-Perot resonator (number of half wavelengths in the resonator). Photodetectors 10 may be photodiodes, phototransistors or photo-electric cells for example.

Intermediate layer 14 forms an optically transmissive metasurface. In the illustrated embodiment, intermediate layer 14 comprises a layer of a first material and arrays of posts 14a of a second material embedded in the first material. As used herein, "embedded" means that the posts 14a are surrounded by the first material in the x and y directions: it does not require or exclude that the first material is present adjacent posts 14a in the z direction. The first material and the second material have different electromagnetic wave propagation properties, e.g. they may have different indexes of refraction. In the illustrated embodiment, all posts 14a have equal heights, which are shorter than the thickness of intermediate layer 14. Preferably, arrays of posts 14a is a sub-wavelength array, that is, an array wherein the light that is used propagates as a coherent wave front in the direction perpendicular to the layers. Typically this involves posts with a diameter and pitch smaller than or of the same diameter or pitch as the wavelength of the light propagating through intermediate layer 14.

FIGS. 2a-f show cross-sections of the arrays through the posts 14a (only one labelled) in the intermediate layer in relation to the locations 20a-f (dashed) of respective ones of the photodetectors of the array of photodetectors underneath the intermediate layer. As can be seen, different arrays of posts 14a can be distinguished, each above the location 20a-f of a different photodetector. Within each array the shapes and orientations of the cross-sections of all posts 14a are the same. The shapes and/or orientations of the cross-sections in different arrays of posts 14a are different.

Preferably, as shown, the shape of the cross-sections has a twofold mirror symmetry (in the figures about planes perpendicular to the x and y axes respectively), the posts 14a in all arrays having parallel mirror symmetry planes. By way of example, posts 14a with rectangular cross section are shown, the posts having different widths and lengths in different arrays of posts 14a, but other non-circular cross-section shapes may be used, such as elliptical shapes with long and short axes of different lengths.

Preferably, as shown, the set of arrays includes pairs of arrays that differ from each other only by a ninety degree rotation, the posts 14a in both arrays of the pair having the same cross sections, except for the ninety degree rotation. By way of illustration, 3×3 arrays are shown, but (much) larger numbers may be used in an array. In an embodiment further posts, having different shape and/or orientation may be combined with the array, e.g. along the edges of the array. As used herein, these further posts are not considered to be part of the array.

Manufacturing processes that are suitable for manufacturing a device of the type of FIGS. 1 and 2 are known per se. A device of the type shown in FIG. 1 and may be manufactured by the steps of manufacturing the array of photo-detectors, depositing the bottom reflector layer (i.e. successively depositing successive sub-layers if the reflector layer has such sub-layers) over the array of photo-detectors, depositing a layer of the material of the posts on the bottom reflector layer, patterning this layer leaving only the posts, depositing the further material of the intermediate layer, so that the posts are embedded in a layer of the further material, and depositing the second reflector layer over the intermediate layer. The patterning may be performed using lithographically, or e-beam writing etc.

In operation, reflector layers 12a,b and intermediate layer 14 act as an array of Fabry-Perot resonators, with resonance wavelengths dependent on the cross-section and height of the posts. Each Fabry-Perot resonator corresponds to a respective one of the arrays of posts, the part of intermediate layer 14 in which the array of posts is embedded and the part of the reflector layers 12a,b above and below the array of posts. Each Fabry-Perot resonator is positioned above the location 20a-f of a respective one of the photodetectors. The resonance frequencies of the Fabry-Perot resonator depend on the shape of the posts in the arrays of posts and the height of the posts. The size of cross-section of the posts and their distance are selected so small that the wavelength (in the intermediate layer) of the light at the resonance frequencies is larger than this size and distance. On the other hand the size of the arrays, i.e. the cross-section of the Fabry-Perot resonators, is preferably larger than a wavelength.

An effect of the non-circularity of shape of the posts is that different resonance frequencies arise for light of different polarization components, the different resonance frequencies corresponding to different free-space wavelengths of incoming light (f=c/lambda, where lambda is the free space wavelength and c is the speed of light in free space, which may differ from the speed of light in the medium through which the incoming light is supplied). As is known, the resonance of the Fabry-Perot resonator requires that a wave propagated between the reflectors has a predetermined phase delay. In the intermediate layer, the propagation velocity of light along the array of posts in the vertical direction of FIG. 1 is different for different eigenmodes of propagation, and hence the phase delay required for resonance occurs for different frequencies for the different eigenmodes of propagation. As the electromagnetic field patterns of the different eigenmodes have different polarization components, the resonance frequencies for light of different polarization components are different.

The polarization direction of an eigenmode depends on the shape of the cross-section of the posts. Typically, the E-field of the polarization component lies in a mirror symmetry plane of the shape of the cross-section of the posts. Preferably, cross-sections with two symmetry planes are used, which symmetry planes are mutually perpendicular, such as rectangular or elliptical cross-sections or any other cross-section shape wherein the shape in one quadrant is repeated in the other quadrants. Preferably the posts in all arrays have the same symmetry planes. This simplifies the relations between the measurements.

The transmission of light through the Fabry-Perot resonator, as a function of free space wave length of the light, peaks at the free space resonance wavelengths. Thus, light transmission through the reflector layers 12a,b and intermediate layer 14 to the photo-detectors 10, as a function of free space wave length of the light, peaks at the free space resonance wavelengths. As used herein, a transmission peak in the transmission of light as a function of free space wavelength or, equivalently, as a function of resonance frequency, will be referred to in abbreviated terms as a "transmission peak" or "resonance peaks" and peaks that coincide as a function of free space wavelength or frequency will be referred to as coinciding peaks. Such coincidence does not require that the frequencies of the peaks are exactly the same: it suffices that the frequencies of the peaks differ by less than the resolution of the spectrometer, e.g. the halfwidth of the transmission peaks.

Peaks are said to correspond with each other if they coincide or are used as if they coincide. This is so for example if two peaks lie within a distance from each other over which the spectral intensity of the incoming light does not significantly change. In an optical spectrometer system that includes resonators that are resonant at a first series of successively increasing frequencies for a first polarization component and a second series of successively increasing frequencies for a second polarization components, each resonant peak of the first series is said to correspond with a resonant peak of the second series if these peaks coincide or at least if are used as if they coincide, for example when they lie closer to each other than to other peaks in the series. In the description of the embodiments, coinciding peaks are used by way of example, but it should be appreciated that corresponding peaks may be used instead.

Similarly, polarization components of different peaks will be said to correspond if these directions or states are the same or when they overlap in the sense that their intensities share a same component, even if they furthermore contain different components. Frequency-polarizations will be said to correspond if both their frequency and their polarization correspond.

The spectrometer comprises arrays of posts that provide for Fabry-Perot resonators that each have a different resonance frequency (i.e. at different free-space wavelength) for the same polarization component. This makes it possible to measure a spectrum by supplying incoming light to the photodetector array via the reflector layers and the intermediate layers, and detecting the intensities at the photo-detectors, which correspond to the intensities of components of the incoming light at the resonance frequencies of the Fabry-Perot resonators above the photo-detectors.

The difference between the different resonance frequencies for light of different polarization components may be quite small (e.g. corresponding to free space wavelength differences of ten to twenty nanometers). When incoming light with a bandwidth broader than the distance between the resonance wavelengths of an array of posts is supplied to the top reflector 12a, the light intensity detected by each photo-detector 10 is a sum of the intensities of different polarization components of the incoming light with the different resonance frequencies of the Fabry-Perot resonator above that photo-detector 10. The intensities of the components can be resolved in various ways.

It has been found that selection of the cross-section shape of the posts makes it possible both to vary the resonance frequencies and the distances between the resonance frequencies of the resonator. It was found that the resonance frequency for a polarization component of a Fabry-Perot resonator formed using the reflector layers and the posts can be varied by up to thirty percent by changing the shape of the cross-section of the posts, even if their height remains the same. The resonance frequencies of different polarization components of such Fabry-Perot resonator can be made to differ by almost as much. For example a cross-section having a much smaller width than its length may have resonance frequencies different by more than half of the frequency range.

Alternatively, the posts in different groups, or even within groups may have different heights. This makes it easier to realize a wide wavelength range spectrometer. A greater variation of the resonance frequencies can be obtained by using posts of different height in different arrays.

Figure 3:
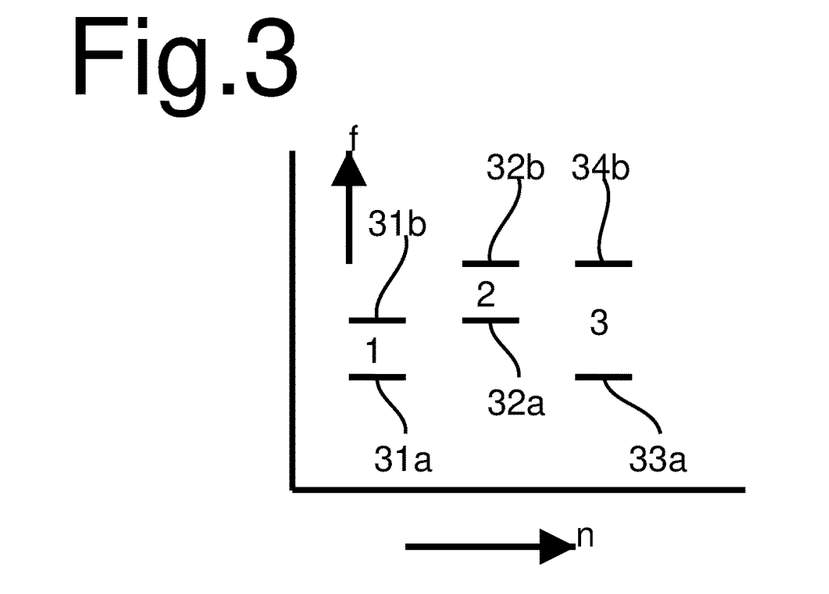
FIG. 3 illustrates relations between resonance frequencies

In particular it has been found that it is possible so select the distances so that the resonance peaks can be made to coincide in a cyclic way, as illustrated schematically in FIG. 3, wherein the resonance frequencies f of the resonators are indicated by horizontal lines and different resonators in the cycle are indicated by labels n=1, 2, 3.

In FIG. 3, the highest frequency peak 31b of the first resonator coincides with the lowest frequency peak 32a of the second resonator. In turn, the highest frequency peak 32b of the second resonator coincides with the highest frequency peak 33b of the third resonator. In the example, the cycle is closed because the lowest frequency peak 33a of the third resonator coincides with the lowest frequency peak 31a of the first resonator. By way of such cyclical selection the total number of different resonance frequencies in a group of resonators can be reduced to the number of resonators or less.

Figure 4:
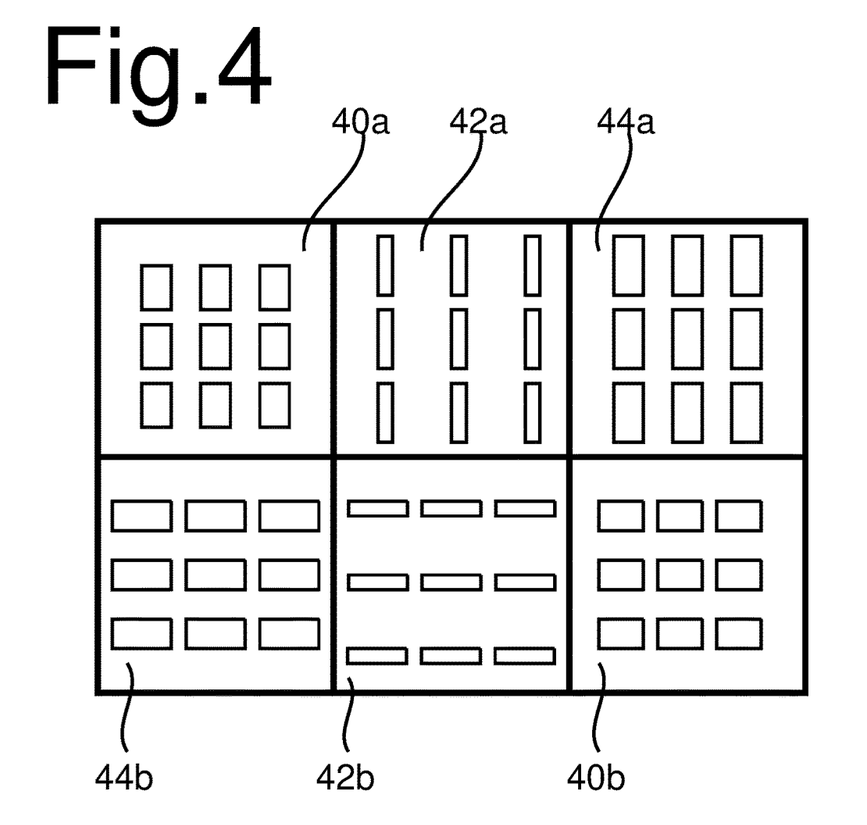
FIG. 4 shows a group of arrays

By rotating an array by ninety degrees, the polarization states associated with the resonance frequencies can be exchanged. Thus it can be ensured that the polarization states of the highest resonance frequency 31b of the first resonator coincides with that of the lowest frequency peak 32a of the second resonator and that the polarization state of the highest frequency peak 32b of the second resonator coincides with that of the highest frequency peak 33b of the third resonator. When an even number of resonators is used, the polarization state of the lowest frequency peak 33a of the third resonator can be made to coincides with that the lowest frequency peak 31a of the first resonator as well. It should be emphasized that these possibilities are not limited to the particular example shown in FIG. 3. For example, the cycle may contain more resonators, and the frequencies may go up and down multiple times along the cycle. FIG. 4 illustrates a cross section of the intermediate layer of a first embodiment. In this embodiment, six arrays 40a,b, 42a,b, 44a,b of posts 14a are used, comprising three pairs 40a,b, 42a,b, 44a,b, wherein the arrays in each pair differ only by a ninety degree rotation of the arrays. Although the arrays are shown arranged in a specific array, it should be appreciated that any other arrangements may be used, e.g. such as the linear arrangement of FIG. 1, or arrangements wherein other arrays of posts lie between the arrays of the group.

The Fabry-Perot resonators comprising the arrays 40a,b, 42a,b, 44a,b are each located above a respective different photo-detector. As a function of frequency, Fabry-Perot resonators with ninety degree rotated arrays have transmission peaks at the same pair of resonance frequencies, but the transmitted polarization components are interchanged. Such Fabry-Perot resonators with ninety degree rotated arrays of posts will be referred to as pairs of Fabry-Perot resonators.

In general, different pairs of Fabry-Perot resonators may have different pairs of resonance frequencies. But it has been found that selection of the cross-section shape makes it possible to select combinations of pairs of resonance frequencies so that the sum of the frequency differences of a first set of the pairs equals a sum of the frequency differences of a second set of the pairs. This makes it possible to limit the number of different resonance frequencies.

In the embodiment, the arrays 40a,b, 42a,b, 44a,b of posts are selected so that the transmission peaks of each pair each coincide with one of the transmission peaks of the other two pairs of Fabry-Perot resonators.

Thus, if the first pair of Fabry-Perot resonators has first and second transmission peaks at lambda1 and lambda2, the arrays of posts 42a,b in the second pair of Fabry-Perot resonators is selected so that the transmission peaks are at lambda2 and lambda3, i.e. at the free space wavelength lambda2 of the second transmission peak of the first pair of Fabry-Perot resonators and at a further wavelength lambda3 different from the frees space wavelength lambda1 of the first pair of Fabry-Perot resonators. The arrays of posts in the third pair of Fabry-Perot resonators are selected so that the transmission peaks are at lambda3 and lambda1, i.e. at the free space wavelength lambda1 of the first transmission peak of the first pair of Fabry-Perot resonators and at a wavelength lambda3 of the second transmission peak of the second pair of Fabry-Perot resonators.

From the intensities measured by the six photodetectors the intensities of the two polarization components at the three free space wavelengths at the transmission peaks can be computed. No further polarization filter other than the group of arrays of posts is needed for this. The detected intensities D1, D2 detected by the photo-detectors that detect intensity of light transmitted through a pair of Fabry-Perot resonators can be expressed as $$D1 = a1*Ia(\text{lambda1}) + b1*Ib(\text{lambda2})$$

$$D2 = a1*Ib(\text{lambda1}) + b1*Ia(\text{lambda2})$$

Herein Ia and Ib are the intensity of a first and second polarization component of the incoming light as a function of the free-space wavelength of the incoming light. In general Ia(lamdba1), Ia(lambda2), Ib(lambda1) and Ib(lambda2) are four independent spectral intensity values of the incoming light for combinations of two free space wavelengths (frequencies) and two polarization components. a1 and b1 are transmission coefficients. Dependent on the circumstances, it may be preferred to use different values for a1 and b1 for different detectors.

The values of a1 and b1 may be determined by calibration, e.g. using successive measurements obtained with calibration light with respective different polarizations and known intensity (e.g. first measurements with Ia(lambda1), Ia(lambda2) and Ia(lambda3) known and Ib(lambda1)=Ib(lambda2)=Ib(lambda3), and second measurements obtained with ninety degree rotation), or using successive measurements obtained with calibration light with respective different narrow band, e.g. monochromatic light (e.g. successive measurements with intensity only for lambda1, lambda1 and lambda3 respectively), or a combination of both.

When three pairs as described in the preceding are used, similar expressions apply for the photo-detectors underneath the other pairs of Fabry-Perot interferometers.

$$D3 = a2*Ia(\lambda2) + b2*Ib(\lambda3)$$

$$D4 = a2*Ib(\lambda2) + b2*Ia(\lambda3)$$

$$D5 = a3*Ia(\lambda3) + b3*Ib(\lambda1)$$

$$D6 = a3*Ib(\lambda3) + b3*Ia(\lambda1)$$

From these equations, six intensities can be determined for wavelength-polarization combinations of the three free space wavelengths and the two polarization components. It may be noted that the six intensities each are linear combinations of the six measured intensities D1-D6. The six intensities can be determined e.g. by computing the coefficients of the linear combinations from a1, a2, a3, b1, b2, b3 in advance and subsequently multiplying the measured intensities D1-D6 with the computed coefficients. Alternatively the equations may be solved for each set of measured intensities.

General methods for solving linear matrix equations may be used for this, but for the particular expressions, the solution can also be obtained by noting that the expressions form a cyclic set of equations $$E(n) = c(n)*J(n) + d(n)*J(n+1))$$

Herein

| | | | |
|---|---|---|---|
| $E(0) = D1$ | $J(0) = Ia(\lambda1)$ | $c(0) = a1$ | $d(0) = b1$ |
| $E(1) = D4$ | $J(1) = Ib(\lambda2)$ | $c(1) = a2$ | $d(1) = b2$ |
| $E(2) = D5$ | $J(2) = Ia(\lambda3)$ | $c(2) = a3$ | $d(2) = b3$ |
| $E(3) = D2$ | $J(3) = Ib(\lambda1)$ | $c(3) = a1$ | $d(3) = b1$ |
| $E(4) = D3$ | $J(4) = Ia(\lambda2)$ | $c(4) = a2$ | $d(4) = b2$ |
| $E(5) = D6$ | $J(5) = Ib(\lambda3)$ | $c(5) = a3$ | $d(5) = b3$ |
| $E(6) = E(0)$ | $J(6) = J(0)$ | | |

As a result, the intensity $J(n+1)$ can be expressed in terms of the intensity $J(n)$ and the measurement $E(n)$ as $J(n+1) = E(n)/d(n) - J(n)*c(n)/d(n)$ and $J(6) = J(0)$. $J(0)$ can be solved from this:

$$J(0) = [Pc(0) - Pd(0)] - 1*\text{Sum of } (-1)n(Pc(n)/c(n))*(Pd(0)/Pd(n))*E(n)$$

Herein the sum is taken over n=0, ..., max, with max=5, Pc(n) is the product of the values c(m) for m=n ... max and similarly is the product of the values d(m) for m=n ... max. It may be noted that the term Pc(n)/c(n) denotes the product of the values c(m) for m=n+1 ... max, with Pc(n)/c(n)=1 for n=max and the term Pd(0)/Pd(n) denotes the product of the values d(m) for m=0 ... n−1, with Pd(0)/Pd(n)=1 for n=0. Once J(0) has been determined, J(n) for all other n can be computed by iteratively using the equation $J(n+1) = E(n)/d(n) - J(n)*c(n)/d(n)$, or alternatively J(n) can be determined by cyclical renumbering J(n), D(n), c(n) and d(n). In the simplified case that a1=a2=a3=a and b1=b2=b3=b $$J(0) = [a6 - b6] - 1*\text{Sum of} (-1)n\ a5 - n*bn*E(n)$$

Similar solutions, with different values of "max", apply for groups of resonators that result in a cyclical set of equations of greater length. It should be emphasized that this is only one example of the way which measurements of combined intensities of different polarization components of light at different frequencies (free space wavelengths) can be used to compute the intensities of the individual polarization components. Basically, given the values of the measured intensities, the expressions for the measured intensities form a set of equations with the intensities of different polarization-frequency combinations as unknowns.

Any numeric or algebraic method for solving a set of equations may be used to solve the intensities of different polarization-frequency combinations. To make such a solution possible, the cross sections of the posts number are selected to limit the number of different frequencies in the measured intensities. A group of resonators is required with transmission peaks at corresponding frequencies so that the number of frequencies N is at most equal to half the number M of resonators in the group. This can be realized by using cross-sections so that there are corresponding peaks for N frequencies for both polarization components (2*N equal to M or smaller than M), or more generally peaks for 2*N different combinations of polarization and frequency.

For example, it is sufficient condition to find a solution that one or more cyclical sets of resonators can be identified in the group, and that each resonator of the group is linked to at least one such a cyclical set, in the sense that the resonator has a peak for a frequency-polarization that corresponds to a frequency-polarization of a resonator in the cyclical set, or to another frequency-polarization of a resonator that is linked to the cyclical set. Thus, it suffices that the resonator is linked via a chain of resonators, wherein the first resonator R(1) has a peak for a frequency-polarization that corresponds to a frequency-polarization of a resonator in the cyclical set, an each successive resonator R(i) has a peak for a frequency-polarization that corresponds to a frequency-polarization of the previous resonator R(i−1) in the chain.

Each cyclical set in a group can be seen as a set of resonators that forms a reduced group, for which the intensities can be computed using a set of cyclic equations as described in the preceding. A group may contain one or more of such reduced groups. In a cyclical set, the resonators R can be labeled with an index i so that R(i)=R(i+M), where M is the number of resonators in the cyclical set, and each resonator R(i) has a peak for a polarization-frequency combination that corresponds only to a polarization-frequency combination of next resonator R(i+1) in the cyclical set.

The embodiment of FIG. 4 is an example that involves a cyclical set of six Fabry-Perot resonators. The cross-sections of the posts (and optionally the heights of the posts) are selected to ensure that these six Fabry-Perot resonators, together, have the property that the one resonance peak of each resonator (R(i), i being the index in the cyclic set) coincides with the resonance peak for the same polarization component of the next resonator (R(i+1)) in the cyclic set and the other resonance peak of the resonator R(i) coincides with the resonance peak for the same polarization component of the previous resonator (R(i−1)) in the cyclic set. Similar solutions can be obtained for cyclic sets with different numbers of Fabry-Perot resonators. Preferably, as in the example the set of resonant free space wavelengths is the same for both polarization components, but this is not strictly necessary.

Although the embodiment of FIG. 4 has pairs of Fabry-Perot resonators with arrays comprising posts having cross-sections that differ only by a rotation over ninety degrees, this is not indispensable. Instead other types of arrays may be used, wherein each array provides for resonance at two different frequencies associated with different polarizations, subject to the same condition on the coincident peaks. In this case, more different coefficients like a1-a3, b1-b3 have to be used, which may be determined by means of calibration measurements, but otherwise the expressions for D1-D6 stay the same, and the intensities can be solved from the expressions. Even when the cross-sections that differ only by a rotation ninety degrees, it may be desirable to use more different coefficient obtained by means of calibration measurements.

Although the embodiment of FIG. 4 uses arrays of posts that result in transmission peaks for polarizations that are aligned along the same directions in all of the Fabry-Perot resonators, because the cross-sections of the posts are mirror symmetric about the same two mirror planes in all arrays of posts, this is not indispensable. The polarization directions of the transmission peaks passed by a Fabry-Perot resonator in the group may be at non ninety degree angles relative to transmission peaks passed by another Fabry-Perot resonator in the group. In this case it may be necessary to use more coefficients in the expressions for the measurement, since a detected intensity may depend on the intensity of more than one polarization component at the same free space wavelength. For example, if a first Fabry-Perot resonator has transmission peaks with polarization peaks an angle with respect to other Fabry-Perot resonators, the expression for D1 might need to be changed to $$D1=a*Ia(\text{lambda1})+a'*Ib(\text{lambda1})+b*Ib(\text{lambda2})+b'*Ia(\text{lambda2})$$

The coefficients a, a', b, b' may be determined by calibration. But it is also possible to compute them using the angle between the polarization directions, for example, when the angle is forty five degrees, a=a' and b=b'. In any case, the intensities Ia, Ib for the three free space wavelength may be computed given the coefficients. The additional coefficients merely result in different values of the solution. However, using pairs of arrays with posts that differ only by a rotation over ninety degrees reduces complexity and increases accuracy.

It should be emphasized that it is not necessary that the group corresponds to a cyclic set any group that allows for inversion of the expressions for the measured intensities in terms of the intensities of the components of the detected intensities. For example, the group of resonators may be expanded in a non-cyclic way with a further resonator R' that has a resonance peak that coincides with a resonance peak for the same polarization component of a resonator in the cyclic set. Since the cyclic set can be used to determine the intensity of this polarization component, the intensity of the other polarization component detected by the further resonator can be determined. Similarly, any group of resonators that can be used to determine the intensity of its polarization components may be expanded with such a further resonator R'.

Figure 5:
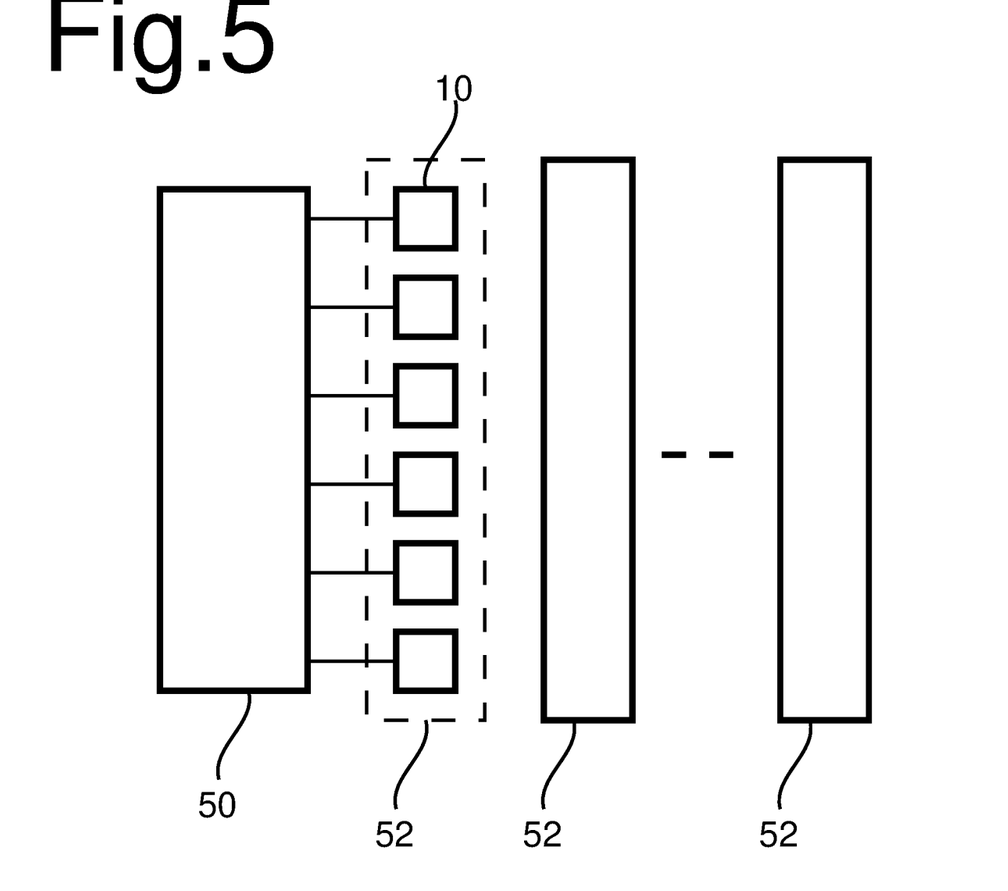
FIG. 5 shows a schematic of a spectrometer

FIG. 5 shows a schematic of an embodiment of the spectrometer system, comprising a group 52 of six photo-detectors 10 and optional further groups 52 of six photo-detectors 10, and a programmed data processing system 50 coupled to the groups 52 of photo-detectors 10. Each group 52 of six photo-detectors 10 has coinciding transmission peaks as discussed in the preceding. In this embodiment data processing system 50 comprises stored instructions that, when executed by data processing system 50 causes data processing system 50 to read signals from the photo-detectors 10 of a group 52, the signals representing the measured intensities D1-D6 for three wavelengths and to compute the intensities Ia, Ib for the wavelength-polarization combinations that are the solution of these equations for the three wavelengths. The instructions may include instructions to repeat this for further groups or for a larger group, to obtain computed intensities of different polarization components for further triplets of frequencies or for more frequencies.

With one triplet a spectra of three frequencies can be determined, with N groups spectra of 3*N frequencies can be determined. As used herein, a data processing system is said to be configured to perform a computation when it is a programmable data processing system with stored instructions to perform this computation, or a data processing system that is hardwired to perform this computation.

When posts of the same height are used in all such groups, the different triplets of frequencies may be realized by using different cross-sections and/or different post spacing in the arrays. Preferably, in a spectrometer, a set of resonators is used that are resonant at a first series of successively increasing frequencies for a first polarization component and a second series of successively increasing frequencies for a second polarization components. Preferably, in the spectrometer, the frequency range spanned by the first series coincides with the frequency range spanned by the second series coincide, or at least substantially coincide in that at most one or a few (e.g. two or three) of the resonance frequencies in each series do not lie in the overlap of the ranges spanned by the first and second series. The frequency range spanned by the spectrometer may be expanded by using posts of different heights in the spectrometer. Posts in different groups, or even within groups may have different heights. This makes it easier to realize a wide wavelength range spectrometer.

In another embodiment data processing system 50 may be configured to compute a one or two dimensional multi-component image. In this case the embodiment of the device may be part of a system that comprises a lens or lenses to form an image on the top reflector layer. As used herein, the term image means that image objects can be distinguished from the intensity distribution in the image. This does not necessarily require that the objects are exactly in focus. In this embodiment the groups may be used to form pixels, arranged in a one or two dimensional matrix of pixels, each pixel comprising a group of Fabry-Perot resonators with the same combination of transmission peaks. Data processing system 50 may be configured to form the image from the computed intensities of different polarization components for different groups. Thus, data processing system 50 may compute an image with component intensities Ia, Ib for combinations of three wavelengths and two polarization combinations. When the device comprises a matrix of cells wherein each cell contains a plurality of groups for different triplets of wavelengths, data processing system 50 may be configured to compute an image for more wavelengths.

It should be appreciated that the embodiment illustrated with FIG. 4 is only an exemplary embodiment. Other ways of determining the intensities for the wavelength-polarization combinations are possible using different arrays of posts are possible. For example, more than six Fabry-Perot resonators may be used in a group with cross-sections and/or lengths of the posts selected to limit the number of resonance frequencies of coinciding resonance peaks. If a plurality of groups is used, it is not necessary that all groups contain the same number of Fabry-Perot resonators. However, use of the same number of Fabry-Perot resonators simplifies the design and make it easier to optimize the design.

When all Fabry-Perot resonators have transmissions for the same two directions of polarization, and each transmission peak for a different combination of a wavelength and a polarization is transmitted by exactly two Fabry-Perot resonators, the expressions for the measured intensities form one or more cyclic sets of equations similar to those for the embodiment of FIG. 4, from which the intensities of the light can readily be derived. More generally, when in Fabry-Perot resonators are used, it suffices that the cross-sections and lengths of the posts are selected so that each Fabry-Perot resonator has transmission peaks for different polarization components at different resonance frequencies and that, for all m Fabry-Perot resonators together, there are subsets of coinciding transmission peaks, each subset corresponding to a different resonance frequency, each subset with two transmission peaks for a first polarization and two for a second polarization at a respective one of the resonance frequencies.

However, less than six Fabry-Perot resonators in a group may also suffice. In applications wherein incoming light is used of which the frequency dependence of the intensity is sufficiently small to prevent significant intensity differences between components at the two resonance frequencies of the Fabry-Perot resonator. In an embodiment of a spectrometer for such application a single pair of Fabry-Perot resonators with ninety degree rotated arrays is used. As noted above, the expression for the detected intensities obtained with such a pair is $$D1=a1*Ia(\text{lambda1})+b1*Ib(\text{lambda2})$$

$$D2=a1*Ib(\text{lambda1})+b1*Ia(\text{lambda2})$$

When it is known that Ia(lambda1) and Ia(lambda2) are substantially the same (Ia=Ia(lambda1)=Ia(lambda2)) and that the same applies to Ib(lambda1) and Ib(lambda2) (Ib=Ib(lambda1)=Ib(lambda2)), Ia and Ib can be solved from this:

$$Ia=(D1*a1-D2*b1)/(a1^2-b1^2)$$

$$Ib=(D2*a1-D1*b1)/(a1^2-b1^2)$$

In an embodiment comprising a plurality of groups of two such combinations of photo-detectors and Fabry-Perot resonators, each group with transmission peaks at a different pair of frequencies, spectra for different polarization components can be determined. In an embodiment with a one or two dimensional matrix with cells containing such groups for the same transmission peaks, images for different polarization components can be determined.

Similarly, when the frequency dependence of the intensity is sufficiently small to prevent significant intensity differences between components at three or four resonance frequencies, two Fabry-Perot resonators with only one or even no coinciding transmission peaks may be used and the intensities for different polarization components may be computed from the measured intensities at the photo-detectors that receive incoming light through these Fabry-Perot resonators.

Compared to this type of embodiment, the embodiment using groups of six Fabry-Perot resonators and transmission peaks at three different resonance frequencies, or more Fabry-Perot resonators provides for a higher spectral resolution, and requires fewer Fabry-Perot resonators to obtain more computed intensities.

In another embodiment two pairs of Fabry-Perot resonators and four photodetectors receiving light from respective ones of the two pairs of Fabry-Perot resonators are used, the Fabry-Perot resonators having the same resonance frequencies (free space wavelengths), but different coupling coefficients so that the photodetectors produce four measurements D1-D4 that can be expressed as $$D1=a1*Ia(\text{lambda1})+b1*Ib(\text{lambda2})$$

$$D2=a1*Ib(\text{lambda1})+b1*Ia(\text{lambda2})$$

$$D3=a2*Ia(\text{lambda1})+b2*Ib(\text{lambda2})$$

$$D4=a2*Ib(\text{lambda1})+b2*Ia(\text{lambda2})$$

From this the four intensities Ia(lambda1), Ia(lambda2), Ib(lambda1), Ib(lambda2) are computed. In a further embodiment comprising a plurality of such groups of four such Fabry-Perot resonators, each group with transmission peaks at the same frequencies, spectra for different polarization components can be determined.

In another embodiment four Fabry-Perot resonators and four photodetectors receiving light from respective ones of the two pairs of Fabry-Perot resonators are used, the Fabry-Perot resonators having the arrays of posts that have cross-section shapes that differ only by 45 degree rotation, and have the same pair of resonance frequencies. In this embodiment, the photodetectors produce four measurements D1-D4 that can be expressed as $$D1=a1*Ia(\text{lambda1})+b1*Ib(\text{lambda2})$$

$$D2=a1*Ib(\text{lambda1})+b1*Ia(\text{lambda2})$$

$$D3=a2*(Ia(\text{lambda1})+Ib(\text{lambda1}))+b2*(Ia(\text{lambda2})+Ib(\text{lambda2}))$$

$$D4=a2*(Ia(\text{lambda2})+Ib(\text{lambda1}))+b2*(Ia(\text{lambda1})+Ib(\text{lambda1}))$$

From this the four intensities Ia(lambda1), Ia(lambda2), Ib(lambda1), Ib(lambda2) are computed.

Although examples have been discussed wherein the number of computed intensities for different combinations of frequency and polarization equals the number of resonators, and this is not necessary. For example less resonators may be used, for example when it suffices to compute only a ratio of the intensity of a combination of frequency and polarization relative to another intensity.

As another example more resonators may be used. This leads to redundancy, but does not prevent computing the intensities. In a further embodiment the redundancy may be used to increase the accuracy, e.g. by fitting (e.g. least square fitting) the computed intensities for different combinations of frequency and polarization to values that minimize the error between the measured intensities and the intensities predicted by means of the expressions.

The invention claimed is:

1. An optical device comprising a stack of a first and second partial reflection layer and an intermediate layer between the first and second partial reflection layer, the intermediate layer comprising a dielectric material and a group of arrays of posts embedded in the dielectric material at different positions along the intermediate layer, the posts being of a material with light propagation properties that differ from those of the dielectric material, each array comprising a plurality of posts, the posts within each array having a same shape and orientation in cross-section with a virtual plane parallel to the reflection layers, the first and second partial reflection layer forming respective optical resonators, each comprising a respective different one of the arrays, the shape and/or orientation of the posts in different ones of the arrays in the group being different from one another, the shape and/or orientation of the posts being configured so that each respective optical resonator has first and second resonance peaks at mutually different resonance frequencies for different polarization components; wherein the optical resonators comprise a cyclically ordered set of optical resonators, wherein a first resonance peak of each of the optical resonators in the cyclically ordered set corresponds with a resonance peak of a next optical resonator in the order of the cyclically ordered set for a same polarization component as the first resonance peak.

2. The optical device according to claim 1, wherein the cyclically ordered set consists of six optical resonators.

3. The optical device according to claim 1, wherein the first resonance peaks of each of the optical resonators in the cyclically ordered set correspond with a resonance peak of at least one other optical resonator in the cyclically ordered set for a different polarization component than the first resonance peak.

4. The optical device according to claim 1, wherein the group of arrays comprises at least one pair of arrays with posts having cross-sections that differ only by a ninety degree rotation.

5. The optical device according to claim 4, wherein the group of arrays consists of a plurality of pairs of arrays, the cross-sections of the posts of the arrays within each pair differ only by a ninety degree rotation.

6. The optical device to claim 1, comprising a further group of arrays of posts embedded in the dielectric material of the intermediate layer, the posts in the arrays of the group having a first height, the posts in the arrays of the further group having a second height, different from the first height.

7. The optical device according to claim 1, comprising a group of photodetectors, each located to receive light transmitted through a respective one of the parts of the stacks.

8. An optical spectrometer system, comprising an optical device according to claim 7 and a data processing system coupled to the photodetectors of the group, the data processing system being configured to compute intensities of different polarization components at the resonance frequencies from intensities detected by the plurality of photodetectors, as a solution of expressions for the intensities detected the plurality of photodetectors dependent on the intensities of the different polarization components at the resonance frequencies.

9. The optical spectrometer system according to claim 8, wherein the group of arrays comprises at least six arrays, the first resonance peaks and the second resonance peaks for the parts of the stack, together, comprising at least three subsets of four corresponding resonance peaks, each subset corresponding to a different resonance frequency, each subset containing two corresponding resonance peaks for a first polarization component and two corresponding resonance peaks for a second polarization component.

10. A method of determining wavelength and polarization dependent intensities of different polarization components of incoming light, the method comprising passing the incoming light through a filter formed by a stack of a first and second partial reflection layer and an intermediate layer between the first and second partial reflection layer, an intermediate layer between the first and second partial reflection layer, the intermediate layer comprising a dielectric material and a group of arrays of posts embedded in the dielectric material intermediate layer, the posts being of a material with light propagation properties that differ from those of the dielectric material, each array comprising a plurality of posts, the posts within each array having a same shape and orientation in cross-section with a virtual plane parallel to the reflection layers, the shape and/or orientation of the posts in different ones of the arrays in the group being different from one another, so that parts of the stack that respectively contain different ones of the arrays each form a respective optical resonator having first and second resonance peaks at different resonance frequencies for different polarization components;

measuring a group of intensities of light obtained by passing the incoming light through respective ones of the optical resonators; and computing the wavelength and polarization dependent intensities of components of incoming light as a solution of expressions for the group of measured intensities dependent on the intensities of the different polarization components at the resonance frequencies.

* * * * *